US009774695B2

(12) United States Patent
Bogdanovic et al.

(10) Patent No.: US 9,774,695 B2
(45) Date of Patent: Sep. 26, 2017

(54) ENHANCED PRESENCE DETECTION FOR ROUTING DECISIONS

(75) Inventors: Ivan Dean Bogdanovic, Brookline, MA (US); Derek MacDonald, Vancouver (CA); John Bratt, Chicago, IL (US)

(73) Assignee: Counterpath Corporation, Vancouver (CA)

( * ) Notice: Subject to any disclaimer, the term of this patent is extended or adjusted under 35 U.S.C. 154(b) by 959 days.

(21) Appl. No.: 12/813,022

(22) Filed: Jun. 10, 2010

(65) Prior Publication Data
US 2011/0072154 A1 Mar. 24, 2011

Related U.S. Application Data

(60) Provisional application No. 61/187,738, filed on Jun. 17, 2009.

(51) Int. Cl.
H04L 29/08 (2006.01)
(52) U.S. Cl.
CPC .............. H04L 67/24 (2013.01); H04L 67/18 (2013.01); H04L 67/28 (2013.01)
(58) Field of Classification Search
CPC ...................................... H04L 67/24
USPC ........................................... 709/238
See application file for complete search history.

(56) References Cited

U.S. PATENT DOCUMENTS

| | | |
|---|---|---|
| 4,989,230 A | 1/1991 | Gillig et al. |
| 5,159,592 A | 10/1992 | Perkins |
| 5,325,362 A | 6/1994 | Aziz |
| 5,357,561 A | 10/1994 | Grube |
| 5,642,185 A | 6/1997 | Altrieth, III et al. |
| 5,708,655 A | 1/1998 | Toth et al. |
| 5,717,737 A | 2/1998 | Doviak et al. |
| 5,726,984 A | 3/1998 | Kubler et al. |
| 5,729,544 A | 3/1998 | Lev et al. |
| 5,734,700 A | 3/1998 | Hauser et al. |
| 5,742,905 A | 4/1998 | Pepe et al. |
| 5,850,391 A | 12/1998 | Essigmann |
| 5,896,369 A | 4/1999 | Warsta et al. |
| 5,991,639 A | 11/1999 | Rautiola et al. |
| 6,009,330 A | 12/1999 | Kennedy, III et al. |
| 6,026,153 A | 2/2000 | Fuller et al. |

(Continued)

FOREIGN PATENT DOCUMENTS

| | | |
|---|---|---|
| EP | 1294204 | 8/2001 |
| EP | 1244323 | 9/2002 |

(Continued)

OTHER PUBLICATIONS

Fors, Chad M. "Integrated WLAN-Cellular Voice Systems" IEEE 2003 Sarnoff Symposium (20 pages).

(Continued)

Primary Examiner — Suraj Joshi
(74) Attorney, Agent, or Firm — Occhiuti & Rohlicek LLP

(57) ABSTRACT

Methods, systems, and apparatus for routing user communication data to a user associated with at least a first user device and a second user device operable in a communication system, including proxying a data message between the first user device and a presence server, extracting, from the data message, information indicative of an availability of the user, and routing user communication data to at least one of the first user device and the second user device based at least in part on the extracted information.

16 Claims, 5 Drawing Sheets

(56) References Cited

U.S. PATENT DOCUMENTS

| | | | |
|---|---|---|---|
| 6,038,446 A | 3/2000 | Courtney et al. |
| 6,038,451 A | 3/2000 | Syed et al. |
| 6,052,725 A | 4/2000 | McCann et al. |
| 6,058,303 A | 5/2000 | Åstöet al. |
| 6,065,120 A | 5/2000 | Laursen et al. |
| 6,069,890 A | 5/2000 | White et al. |
| 6,075,783 A | 6/2000 | Voit |
| 6,104,711 A | 8/2000 | Voit |
| 6,118,778 A | 9/2000 | Amin |
| 6,122,263 A | 9/2000 | Dahlin et al. |
| 6,125,113 A | 9/2000 | Farris et al. |
| 6,131,028 A | 10/2000 | Whitington |
| 6,134,316 A | 10/2000 | Kalliomiemi et al. |
| 6,137,791 A | 10/2000 | Frid et al. |
| 6,144,671 A | 11/2000 | Perinpanathan et al. |
| 6,161,008 A | 12/2000 | Lee et al. |
| 6,167,040 A | 12/2000 | Haeggstrom |
| 6,167,119 A | 12/2000 | Bartholomew et al. |
| 6,181,935 B1 | 1/2001 | Gossman et al. |
| 6,185,204 B1 | 2/2001 | Voit |
| 6,195,545 B1 | 2/2001 | Baker et al. |
| 6,198,920 B1 | 3/2001 | Doviak et al. |
| 6,215,790 B1 | 4/2001 | Voit et al. |
| 6,219,694 B1 | 4/2001 | Lazaridis et al. |
| 6,222,829 B1 | 4/2001 | Karlsson et al. |
| 6,230,005 B1 | 5/2001 | Le et al. |
| 6,233,463 B1 | 5/2001 | Wiedeman |
| 6,282,574 B1 | 8/2001 | Voit |
| 6,285,877 B1 | 9/2001 | Liu et al. |
| 6,295,293 B1 | 9/2001 | Tönnby et al. |
| 6,304,753 B1 | 10/2001 | Hartmaier |
| 6,317,484 B1 | 11/2001 | McAllister |
| 6,320,873 B1 | 11/2001 | Nevo et al. |
| 6,353,607 B1 | 3/2002 | Valentine et al. |
| 6,366,777 B1 | 4/2002 | Uusitalo |
| 6,393,014 B1 | 5/2002 | Daly et al. |
| 6,400,937 B1 | 6/2002 | Charas et al. |
| 6,400,946 B1 | 6/2002 | Vazvan et al. |
| 6,418,324 B1 | 7/2002 | Doviak et al. |
| 6,463,055 B1 | 10/2002 | Lupien et al. |
| 6,466,556 B1 | 10/2002 | Boudreaux |
| 6,519,242 B1 | 2/2003 | Emery et al. |
| 6,519,252 B2 | 2/2003 | Sallberg |
| 6,522,876 B1 | 2/2003 | Weiland et al. |
| 6,526,033 B1 | 2/2003 | Wang et al. |
| 6,535,607 B1 | 3/2003 | Chandersekaran et al. |
| 6,542,497 B1 | 4/2003 | Curry et al. |
| 6,542,739 B1 | 4/2003 | Garner |
| 6,545,992 B2 | 4/2003 | Naqvi et al. |
| 6,560,216 B1 | 5/2003 | McNiff et al. |
| 6,560,457 B1 | 5/2003 | Silver et al. |
| 6,587,457 B1 | 7/2003 | Mikkonen |
| 6,591,103 B1 | 7/2003 | Dunn et al. |
| 6,594,253 B1 | 7/2003 | Sallberg et al. |
| 6,594,666 B1 | 7/2003 | Biswas et al. |
| 6,597,910 B1 | 7/2003 | Ra |
| 6,608,932 B1 | 8/2003 | Rasmussen et al. |
| 6,611,692 B2 | 8/2003 | Raffel et al. |
| 6,614,781 B1 | 9/2003 | Elliott et al. |
| 6,647,260 B2 | 11/2003 | Dusse et al. |
| 6,647,426 B2 | 11/2003 | Mohammed |
| 6,658,259 B2 | 12/2003 | McIntosh |
| 6,671,506 B1 | 12/2003 | Lee |
| 6,678,524 B1 | 1/2004 | Hansson et al. |
| 6,680,923 B1 | 1/2004 | Leon |
| 6,683,870 B1 | 1/2004 | Archer |
| 6,711,146 B2 | 3/2004 | Yegoshin |
| 6,718,178 B1 | 4/2004 | Sladek et al. |
| 6,721,306 B1 | 4/2004 | Farris et al. |
| 6,721,565 B1 | 4/2004 | Ejzak et al. |
| 6,725,044 B2 | 4/2004 | Verma et al. |
| 6,744,875 B1 | 6/2004 | Wehrend et al. |
| 6,754,489 B1 | 6/2004 | Roux |
| 6,754,833 B1 | 6/2004 | Black et al. |
| 6,768,726 B2 | 7/2004 | Dorenbosch et al. |
| 6,804,532 B1 | 10/2004 | Moon et al. |
| 6,816,912 B1 | 11/2004 | Borella et al. |
| 6,871,070 B2 | 3/2005 | Ejzak |
| 6,879,833 B2 | 4/2005 | Oh et al. |
| 6,882,838 B1 | 4/2005 | Lee et al. |
| 6,904,029 B2 | 6/2005 | Fors et al. |
| 6,931,249 B2 | 8/2005 | Fors et al. |
| 6,937,150 B2 | 8/2005 | Medema et al. |
| 6,963,918 B1 | 11/2005 | Leung |
| 6,985,478 B2 | 1/2006 | Pogossiants et al. |
| 7,003,295 B1 | 2/2006 | Cook et al. |
| 7,003,298 B1 | 2/2006 | Jagadeesan |
| 7,072,323 B2 | 7/2006 | Roberts et al. |
| 7,082,301 B2 | 7/2006 | Jagadeesan et al. |
| 7,130,296 B2 | 10/2006 | McNiff et al. |
| 7,280,530 B2 | 10/2007 | Chang et al. |
| 7,283,823 B2 | 10/2007 | Pearce et al. |
| 7,502,615 B2 | 3/2009 | Wilhoite et al. |
| 2001/0012282 A1 | 8/2001 | Yegoshin |
| 2002/0067707 A1 | 6/2002 | Morales et al. |
| 2002/0075850 A1 | 6/2002 | Cruz et al. |
| 2002/0111169 A1 | 8/2002 | Vanghi |
| 2002/0132630 A1 | 9/2002 | Arazi et al. |
| 2002/0147008 A1 | 10/2002 | Kallio |
| 2002/0155834 A1 | 10/2002 | Olmstead et al. |
| 2003/0076808 A1 | 4/2003 | McNiff et al. |
| 2003/0105864 A1 | 6/2003 | Mulligan et al. |
| 2003/0114158 A1 | 6/2003 | Soderbacka et al. |
| 2003/0119490 A1 | 6/2003 | Mohammed |
| 2003/0134648 A1 | 7/2003 | Reed et al. |
| 2003/0134650 A1 | 7/2003 | Sundar et al. |
| 2003/0157935 A1 | 8/2003 | Kauhanen |
| 2003/0187949 A1 | 10/2003 | Bhatt et al. |
| 2003/0195002 A1 | 10/2003 | Singhal et al. |
| 2003/0206520 A1 | 11/2003 | Wu et al. |
| 2003/0216144 A1 | 11/2003 | Roese et al. |
| 2003/0224795 A1 | 12/2003 | Wilhoite et al. |
| 2004/0008645 A1 | 1/2004 | Janevski et al. |
| 2004/0008661 A1 | 1/2004 | Myles et al. |
| 2004/0023669 A1 | 2/2004 | Reddy |
| 2004/0062223 A1 | 4/2004 | Boyd et al. |
| 2004/0072593 A1 | 4/2004 | Robbins et al. |
| 2004/0087307 A1 | 5/2004 | Ibe et al. |
| 2004/0106408 A1 | 6/2004 | Beasley et al. |
| 2004/0114553 A1 | 6/2004 | Jiang et al. |
| 2004/0132500 A1 | 7/2004 | Rogalski et al. |
| 2004/0146021 A1 | 7/2004 | Fors et al. |
| 2004/0203788 A1 | 10/2004 | Fors et al. |
| 2005/0035857 A1 | 2/2005 | Zhang et al. |
| 2005/0090259 A1 | 4/2005 | Jain et al. |
| 2005/0186960 A1 | 8/2005 | Jiang |
| 2005/0198337 A1 | 9/2005 | Sun et al. |
| 2006/0011716 A1 | 1/2006 | Perkowski |
| 2006/0104264 A1 | 5/2006 | Cho |
| 2006/0223498 A1 | 10/2006 | Gallagher et al. |
| 2006/0224664 A1 | 10/2006 | Giliberto et al. |
| 2007/0070976 A1 | 3/2007 | Mussman et al. |
| 2007/0165653 A1* | 7/2007 | Wiatrak et al. ............. 370/401 |
| 2007/0233798 A1* | 10/2007 | Kelley et al. ............. 709/206 |
| 2007/0297373 A1 | 12/2007 | Saifullah et al. |
| 2008/0075066 A1* | 3/2008 | Baker ............ 370/352 |
| 2008/0133580 A1 | 6/2008 | Wanless et al. |
| 2008/0153497 A1 | 6/2008 | Kalhan |
| 2009/0003265 A1 | 1/2009 | Agarwal et al. |
| 2009/0066510 A1 | 3/2009 | Kamdar et al. |
| 2009/0170519 A1 | 7/2009 | Wilhoite et al. |

FOREIGN PATENT DOCUMENTS

| | | |
|---|---|---|
| EP | 1296582 | 3/2003 |
| WO | 92/03878 | 3/1992 |
| WO | 97/16916 | 5/1997 |
| WO | 99/59364 | 11/1999 |
| WO | 00/02406 | 1/2000 |
| WO | 00/08880 | 2/2000 |
| WO | 00/22805 | 4/2000 |
| WO | 00/38391 | 6/2000 |
| WO | 00/69156 | 11/2000 |
| WO | 01/31842 | 5/2001 |

(56) References Cited

FOREIGN PATENT DOCUMENTS

| WO | 01/76276 | 10/2001 |
|---|---|---|
| WO | 02/49298 | 6/2002 |
| WO | 03/061177 | 7/2003 |
| WO | 03/085992 | 10/2003 |
| WO | 2004/036770 | 4/2004 |
| WO | 2004/006876 | 8/2004 |
| WO | 2004/066707 | 8/2004 |
| WO | 2006/020168 | 2/2006 |
| WO | 2007/079258 | 7/2007 |

OTHER PUBLICATIONS

Chad Fors et al. "Integrated WLAN-Cellular Voice Systems" Global Telecommunications Solutions Sector, Motorola, Inc. (4 pages).
Robert L. Geiger et al. "Wireless Network Extension using Mobile IP" Proceedings of COMPCON, 1996 (pp. 9-14).
Nishith D. Tripathi et al. "Handoff in Cellular Systems" IEEE Personal Communications, Dec. 1998 (pp. 26-37).
Sirin Tekinay and Bijan Jabbari "Handover and Channel Assignment in Mobile Cellular Networks" IEEE Communications Magazine, Nov. 1991 (pp. 42-46).
Moe Rahnema "Overview of the GSM System and Protocol Architecture" IEEE Communications Magazine, Apr. 1993 (pp. 92-100).
Wanjiun Liao et al. "VoIP Mobility in IP/Cellular Network Internetworking" IEEE Communications Magazine, Apr. 2000 (pp. 70-75).
Kaveh Pahlavan et al. "Handoff in Hybrid Mobile Data Networks" IEEE Personal Communications, Apr. 2000 (pp. 34-47).
Sahraoui et al., "Mobile VOIP", XP055294286, May 10, 2006, pp. 1-41.

\* cited by examiner

ENHANCED PRESENCE DETECTION FOR ROUTING DECISIONS

CROSS-REFERENCE TO RELATED APPLICATIONS

This application claims the benefit of U.S. Provisional Application No. 61/187,738 filed Jun. 17, 2009. This application is related to U.S. patent application Ser. No. 11/183,379. The contents of both applications are incorporated herein by reference.

BACKGROUND

Cellular telephone systems and Internet protocol systems (e.g., Voice-over-IP, instant messaging) provide mobility to users allowing them to remain "connected" on at least one network as they travel over a wide geographic area. An approach has been proposed to coordinate cellular telephone and IP-based telephony such that information to a cellular telephone user can be directed to an IP-based telephone when the user can receive calls as such a telephone, and calls can be handed off between an IP-based connection and a cellular telephone based connection.

In addition, mobile telephone units are becoming available that include radio interfaces to both cellular telephone radio networks, and wireless local area networks. For example, a user can use telephone services over the cellular network while accessing data services over the wireless local area network.

SUMMARY

In general, in one aspect, the invention features a method for routing user communication data to a user associated with at least a first user device and a second user device operable in a communication system. The method includes proxying a data message between the first user device and a presence server; extracting, from the data message, information indicative of an availability of the user; and routing user communication data to at least one of the first user device and the second user device based at least in part on the extracted information.

Embodiments of the invention may include one or more of the following features.

The method may further include obtaining information indicative of a geographic location of the first user device, a geographic location of the second user device, or both. The method may further include generating a set of routing rules and associating the generated set of routing rules with the user, wherein at least some of the routing rules are based on one or more of the following: geographic location of the first user device, geographic location of the second user device, and the availability of the user. The generated set of routing rules may be stored. At least one exception to a routing rule of the set may be generated. The data message may include a status indicator. The communication system may include a cellular domain and a broadband domain.

The method may further include obtaining schedule information associated with the user from a presence-silent application running on the first user device; and inferring the availability of the user based at least in part on the schedule information. The method may further include identifying a discrepancy between information indicative of a geographic location of the first user device and the schedule information; and routing the user communication data after resolving the identified discrepancy.

In general, in another aspect, the invention features software, embodied on a tangible computer-readable medium, including instructions, which when executed on a computer system cause the computer system to: proxy a data message between a first user device and a presence server; extract, from the data message, information indicative of an availability of a user associated with the first user device; and route user communication data to at least one of the first user device and a second user device associated with the user based at least in part on the extracted information.

In general, in another aspect, the invention features a fixed-mobile convergence device including a processor; a storage medium storing software program instructions that are executable by the processor to: proxy data messages between user devices and a presence server; extract, from at least some of the data message, information indicative of user availability; and route user communication data to user devices based at least in part on the extracted information.

Other features and advantages of the invention are apparent from the following description, and from the claims.

DESCRIPTION

Presence information is a status indicator that conveys a potential participant's current ability and willingness to engage in a communication session using a particular application. Examples of status indicators include "available," "busy," "away," "idle," "invisible," and "do not disturb."

Figure 1:
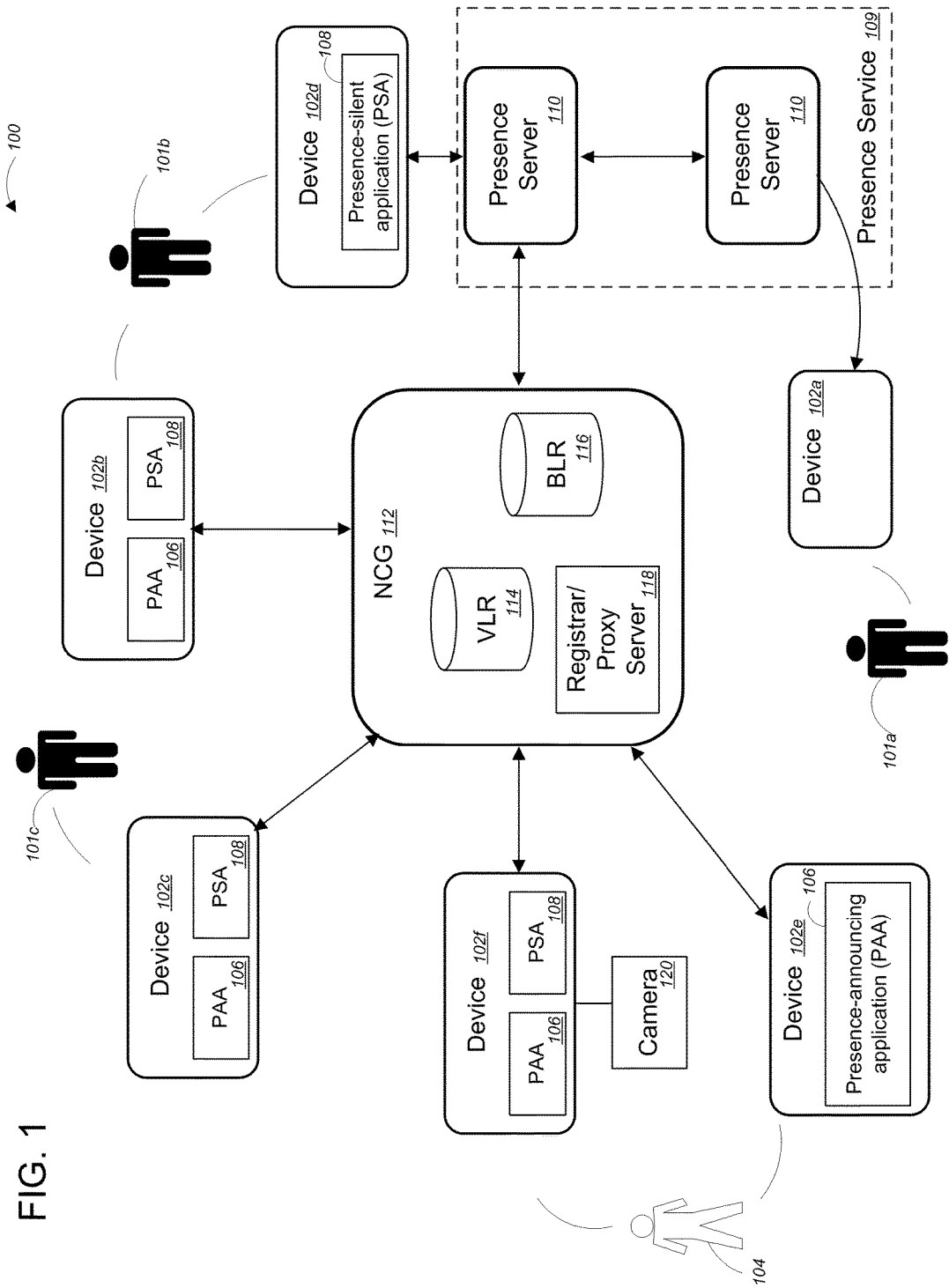
FIG. 1 is a block diagram of a communication system including mobile and Internet-protocol networks.

FIG. 1 shows one implementation of a communication system 100 that supports the establishment of real-time (or near real-time) communication sessions between two or more user devices (e.g., any of devices 102a-f). The term "user device" as used in this description generally refers to any device that is operable by a human operator (e.g., user 101, user 104) to originate or receive user communication data (including, e.g., text, voice, other data) using a user interface of an application. Examples of user devices include single-mode mobile telephones that are capable of communicating using a mobile network approach, multi-mode mobile telephones that are capable of communicating using at least one mobile network approach and at least one broadband network approach, dedicated hardware-based Voice over IP (VoIP) phones, and personal computing devices having software-based telephone ("softphone") capabilities. In this application, when we refer to a "user device 102," without a specific label "a-f," the description will be applicable to one or more of the devices 102a-f. More details about how these devices operate within the mobile and broadband-based communication domains are provided in U.S. patent application Ser. No. 11/183,379.

A user device 102 can include one or more "presence-announcing" applications 106, which generally refers to any application that publishes a user's presence state. Alternatively or in addition, a device 102 can include one or more "presence-silent" applications 108, which generally refers to applications that do not publish or otherwise provide any presence-related information. Examples of presence-announcing applications (PAAs) 106 include instant messaging applications and internet telephony applications, as well as chat programs that can be associated with a website or an email application; examples of presence-silent applications (PSAs) 108 include email applications without associated chat programs and calendaring applications. In some examples, a user device includes neither a PAA 106 nor a PSA 108.

The communication system 100 includes at least one conventional presence service 109 that accepts, stores, and distributes presence information for users 101 and 104. The presence service 109 may be implemented as a single presence server 110 or have an internal structure involving multiple presence servers 110 and proxies. There may be complex patterns of redirection and proxying while retaining logical connectivity to the single presence service 109.

The communication system 100 also includes a network convergence gateway (NCG) 112. In general, the NCG 112 is a carrier-based, core network, fixed mobile convergence (FMC) server that bridges broadband and mobile networks in both IP multimedia subsystem (IMS) and pre-IMS environments. One commercial embodiment of the NCG 112, available from CounterPath® Corporation, mediates between an SS7-based mobile network and an SIP-based VoIP network. The NCG 112 functions as a mobile switching center (MSC) in a GSM network and a session initiation protocol (SIP) Registrar/Proxy in the VoIP network. The NCG 112 contains a visitor location register (VLR) 114, which is a database containing configuration data (e.g., calling restrictions, call forwarding activity, message waiting indicator, SIM card number, electronic serial number) for a user device 102, a broadband location register (116), which is a database including user information (e.g., physical location, present status), and registrar and proxy servers 118, which are examples of traditional VoIP equipment. Using the NCG 112, service providers can extend single-number mobile voice, text, multimedia messaging and video services to residential, corporate and hotspot locations having broadband access.

The presence servers 110 may also share presence information with other applications, such as applications within the NCG 112, as well as with other devices 102 who are authorized to receive presence information (e.g., users 101 who are members of the user 104's "buddy list" would receive updates about user 104).

The term "active mobile domain presence user device" or simply "AMDP user device" generally refers to a user device that has an active presence on a mobile domain of the communication system, and the term "active broadband domain presence user device" or simply "ABDP user device" generally refers to a user device that can have an active mobile presence on a broadband domain of the communication system, an active broadband presence on a broadband domain of the communication system, or both. It should be noted that a single user device having a single identifying number may at different points in time be considered an AMDP user device or an ABDP user device while roaming between partnering mobile networks and broadband networks.

In operation, data originating or terminating at an ABDP user device can pass through the NCG 112. As an example, when a user of an ABDP user device launches a presence-announcing application 106 or otherwise modifies the status indicator associated with the presence-announcing application 106, information representative of the user's status indicator ("presence information") is passed to the appropriate presence service 109 via the NCG 112 and published. In another example, the presence-announcing application may infer the user's status indicator based on activity on the ABDP user device (e.g., detection of mouse clicks or keyboard taps within a time period, or other user activity, such as motion detected by a camera 120) and then pass the user's status indicator to the NCG 112 to be published. Alternatively or in addition, the NCG 112 determines a user's availability by receiving information from a PAA 112 that is running on an AMDP user device 102 or by inferring the user's availability based on one or more of recent user activity on the user device, a rule supplied by the user (e.g., in a PSA 114, such as a calendar application), or a previous rule associated with a geo-location of the user that matches the current geo-location of the user.

Regardless of how the user's status for a user device 102 is determined, representative presence information is published by the presence-announcing application 106 in a presence related message that is passed from the user device 102 to the NCG 112 and on to the presence service 109. The NCG 112 acts as a back-to-back user agent. For each received presence-related message for the user, the NCG 112 extracts the user's presence information and stores the extracted presence information along with a user identifier in the BLR 116 for subsequent use in routing calls and messages to that user. The user identifier uniquely identifies the user within the communication system. The user's presence information stored by the NCG 112 is shared across the multiple user devices 102 associated with the user, and the same presence information can be used for each of the user devices. In some implementations, presence information and other information (e.g., geo-location) about the user can be stored in the VLR 114, the BLR 116, or both. In some implementations, the NCG 112 overwrites the presence information stored in the BLR 116 each time a new presence-related message associated with the user is received.

In the following sections, we describe techniques that may be implemented by the NCG 112 to route calls and messages to ABDP or AMDP user devices 102 based at least in part on information stored in the BLR 116.

Routing Decisions

The NCG 112 provides multiple options for the routing of inbound calls or inbound data. The NCG 112 can route calls/data based on the registration of the user device 102. For example, one user device 102$f$ associated with the user 104 is a laptop computer on the broadband domain of the communication system 100 and another user device 102$e$ associated with the user 104 is a mobile phone on the mobile domain of the communication system 100. If the user device 102$f$ has a softphone application that is locally registered with the NCG 112, the NCG routes the call/data to the ABDP user device 102$f$. If the softphone application is not locally registered, the NCG 112 routes the call/data to the mobile network/SMS-C for delivery to the AMDP user device 102$e$.

The NCG 112 can route the call/data to both the ABDP user device 102$e$ and to the AMDP user device 102$f$. In some examples, the NCG 112 can be configured to direct future incoming calls/data to a specific user device 102, depending on the behavior of the user 104. For example, if the NCG 112 routes calls/data to both user devices 102$e$ and 102$f$ and the user 104 answers the incoming call or responds to the incoming data using the softphone application on the ABDP user device 102$f$, the NCG 112 can record this usage in the BLR 116 and direct future incoming calls/data to the ABDP user device 102*f* for a specified time (e.g., five minutes, an hour).

The NCG 112 can route calls/data based on presence information that is stored in the VLR 114, the BLR 116, or both. The presence information that triggers a particular routing (e.g., to the ABDP user device 102*f* or to the AMDP user device 102*e*) is configurable within the NCG 112. For example, presence information for a user 104 that contains a status of "not available" or "away" for the ABDP user device 102*f* triggers the NCG 112 to route incoming calls/data to the AMDP device 102*e*. Likewise, user presence information that contains a status of "available" for the ABDP user device 102*f* triggers the NCG 112 to route incoming calls/data to the ABDP device 102*f*. A presence information that contains a status of "do not disturb" for either device triggers the NCG 112 to route incoming calls/data to neither device 102*e* nor device 102*f* and, instead, to send the call/data to voicemail/SMS-C for storage.

The same options and routing rules or different options and routing rules may be applied by the NCG 112 for a specific user 104 across different devices 102 associated with the user 104.

Figures 2A, 2B:
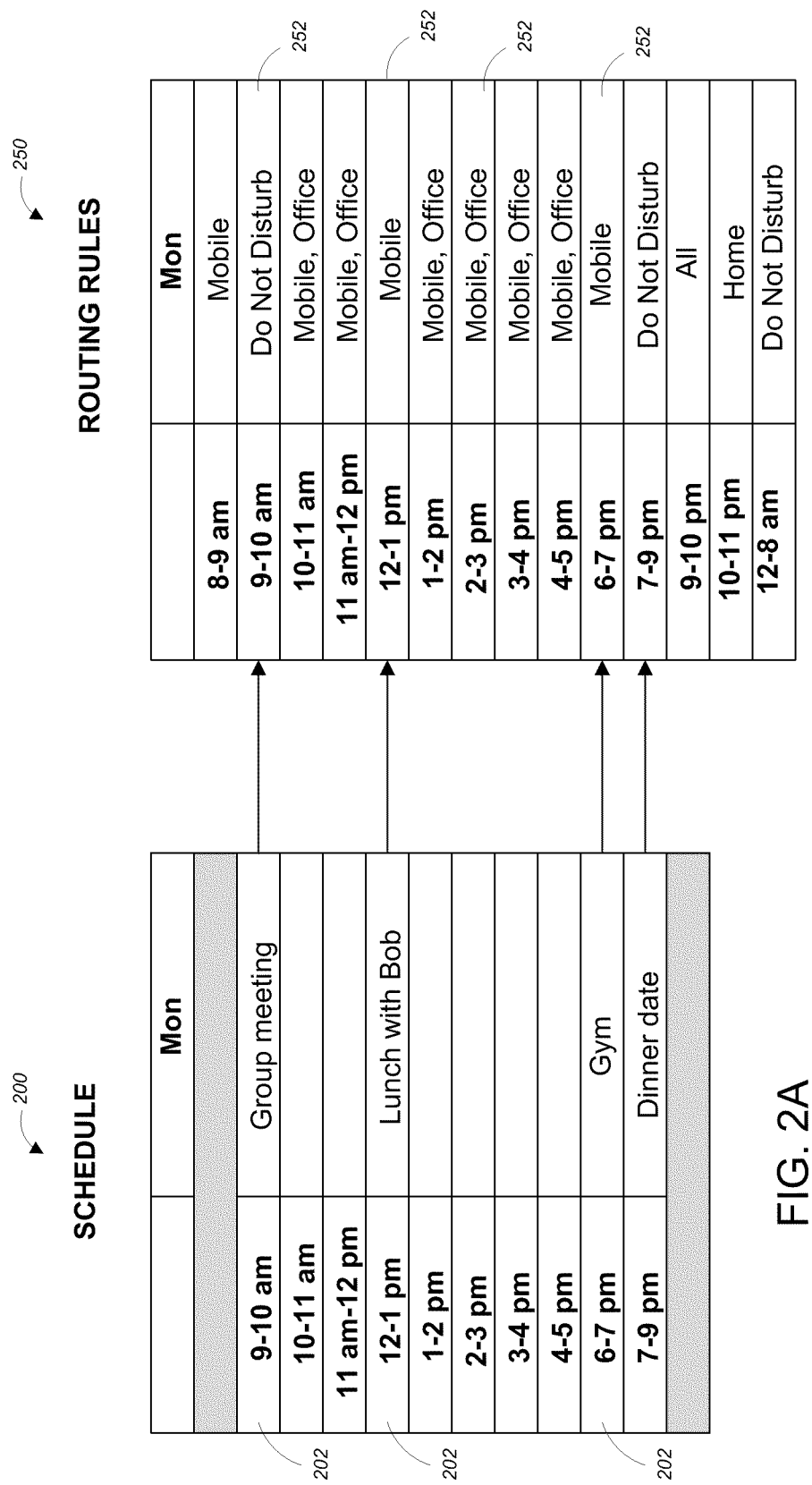
FIG. 2A is a schedule associated with a user.
FIG. 2B is an example set of routing rules that corresponds to the schedule of FIG. 2A.

Alternatively or in addition, the NCG 112 can obtain other information that is related to presence information from one or more presence-silent applications 108, such as a calendar program (e.g., Microsoft Outlook, Google Calendar) or an activity monitor (e.g., the camera 120). Although these presence-silent applications 108 do not broadcast the user's presence, they may still contain information that is relevant to the presence of the user and can be configured to share this information with the NCG 112. Referring to FIG. 2A, a schedule 200 is associated with the user 104 and includes entries 202 (e.g., "Group meeting" between 9 and 10 am, "Lunch with Bob" between 12 and 1 pm, "Gym" between 6 and 7 pm, and "Dinner date" between 7 and 9 pm). Additional entries 202 (e.g., gray areas) can be added that represent repeating events, such as commuting times, sleeping times, or other times.

Referring to FIG. 2B, routing rules 250 are listed that are associated with the user 104 during the schedule 200 shown in FIG. 2A. Rules 252 describe which devices 102 (if any) will receive incoming information during the times that correspond to entries 202. For example, rule 252 between 9 and 10 am is "Do Not Disturb" and corresponds to the entry 202 "Group meeting." Similarly, rule 252 between 12 and 1 pm is "Mobile" and corresponds to the entry 202 "Lunch with Bob." Other rules 252 may instruct the NCG 112 to route incoming information to one or more of the devices 102 corresponding to "Mobile," "Office," or "Home." Some rules 252 may instruct the NCG 112 to route incoming calls to "All" possible devices 102.

In some examples, the user 104 manually enters the routing rule 252 for each schedule entry 202. In some examples, the NCG 112 can learn patterns based on the presence information for the user 104 that is stored in the BLR 116 and previous routing rules 250 that were entered by the user 104 (e.g., when at the geo-location of the gym, then forward calls to "Mobile"). Alternatively or in addition, the NCG 112 can detect inconsistencies in the schedule 200 (e.g., the entry 202 is "Gym," although the geo-location in the BLR 116 is "Office,"). When such inconsistencies are detected, the NCG 112 can be programmed to use rules for the last instance of the detected location (e.g., use rules for last "Office" entry) instead of rules for the pre-programmed location (e.g., "Gym").

In some examples, a user 104 may create exceptions to rules, such as, a list of "always ring everywhere" callers/data-senders or an "emergency" option that the caller or data-sender could select that would override a "Do Not Disturb" setting.

Communication Among Devices

Figure 3:
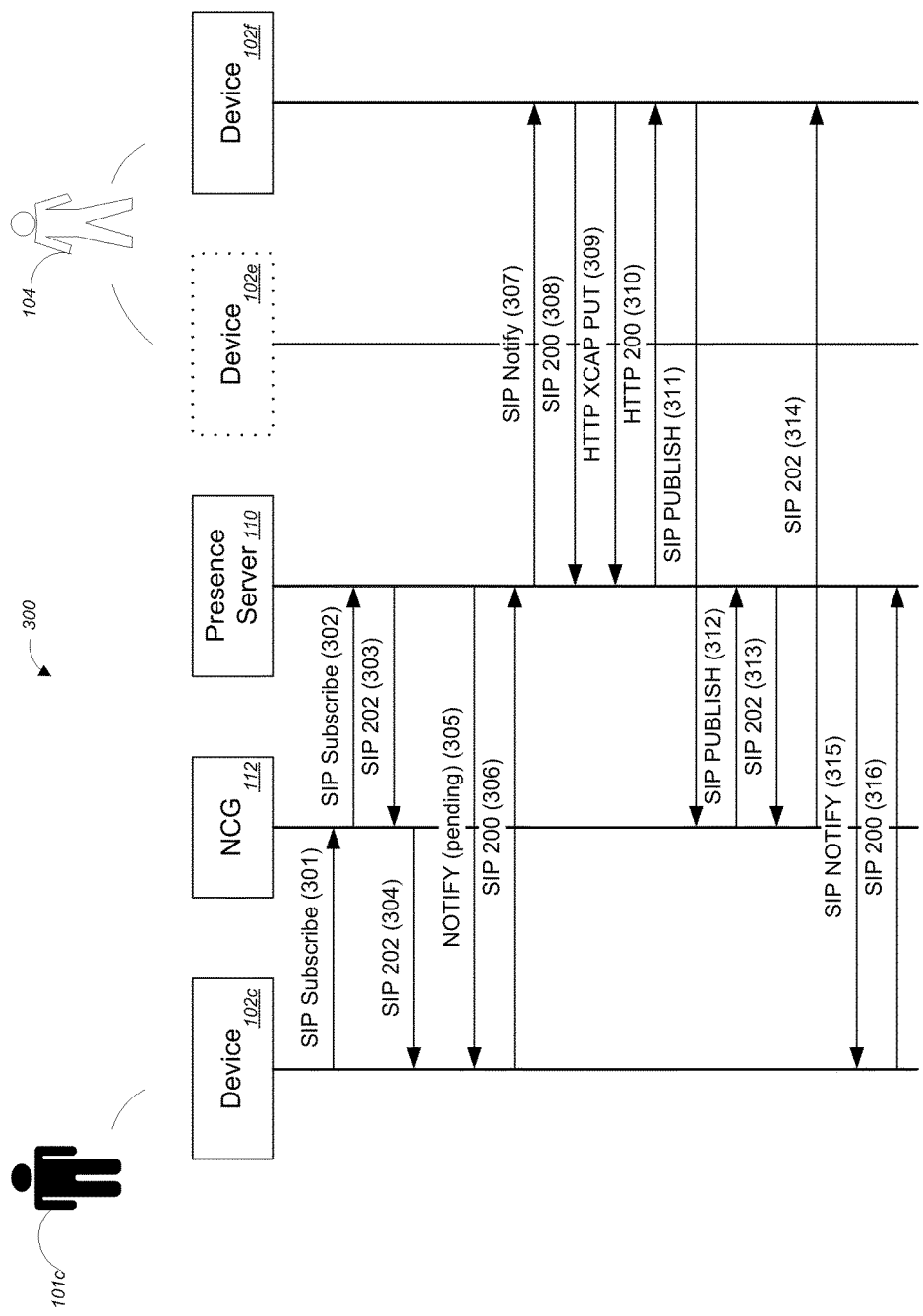
FIG. 3 is a timing diagram of example communications between a presence server and devices.

Referring to FIG. 3, a timing diagram 300 illustrates communications among user devices 102, the presence server 110, and the NCG 112. The user device 102*c*, which could be an ABDP device, such as a laptop or desktop computer, or an AMDP device, such as a multi-mode mobile phone), associated with the user 101*c* is locally registered with the NCG 112. The user 101*c* wants to add the user 104 to his "buddy list" so that he may see the presence status for the user 104. The user 101*c* sends (301) a "Session Initiation Protocol (SIP) subscribe" request from the device 102*c* to the NCG 112 requesting to add user 104 to his buddy list. The NCG 112 proxies or passes (302) the SIP subscribe request to the presence server 110, which replies (303) to the NCG with a "SIP 202" message confirming that the request was accepted. The NCG 112 proxies (304) the SIP 202 message to the user device 102*c*. Next the presence server 110 sends (305) a "NOTIFY (pending)" to the NCG 112, which proxies (306) the "NOTIFY (pending)" message to the user device 102*c*. The "NOTIFY (pending)" message signifies that the subscription request has been received but that permission information is insufficient to accept or to deny the subscription at this time. The user device 102*c* replies (307) to the presence server 110 with a "SIP 200" message indicating that the "NOTIFY (pending)" was received. The presence server 110 sends (308) a "SIP Notify" message to the user device 102*f* associated with the user 104 and the user device 102*f* replies (309) with a SIP 200 message, indicating that the SIP Notify was accepted. The user device 102*f* then displays a dialog box indicating that the user 101*c* wants to add him to his buddy list. The user device 102*f* sends (310) an "HTTP XCAP PUT" response to the presence server 110, signifying that the user 104 agrees to be added to the buddy list of user 101*c*. The presence server 110 replies (311) to the user device 102*f* with an "HTTP 200" message indicating that the previous message was accepted. The user device 102*f* associated with the user 104 sends (312) a "SIP Publish" message to the NCG 112 that indicates the presence information for the user 104. The NCG 112 proxies (313) the presence information for the user 104 to the presence server 110, which confirms (314) receipt by sending the NCG an "SIP 202" message The NCG 112 proxies (315) the presence server's reply to the user device 102*f* associated with the user 104. The user device 102*c* associated with the user 101*c* receives (316) confirmation "SIP NOTIFY" so that the user 101*c* is able to see the presence information for the user 104. The user device 102*c* replies (317) to the presence server 110 that the information was accepted.

Figure 4:
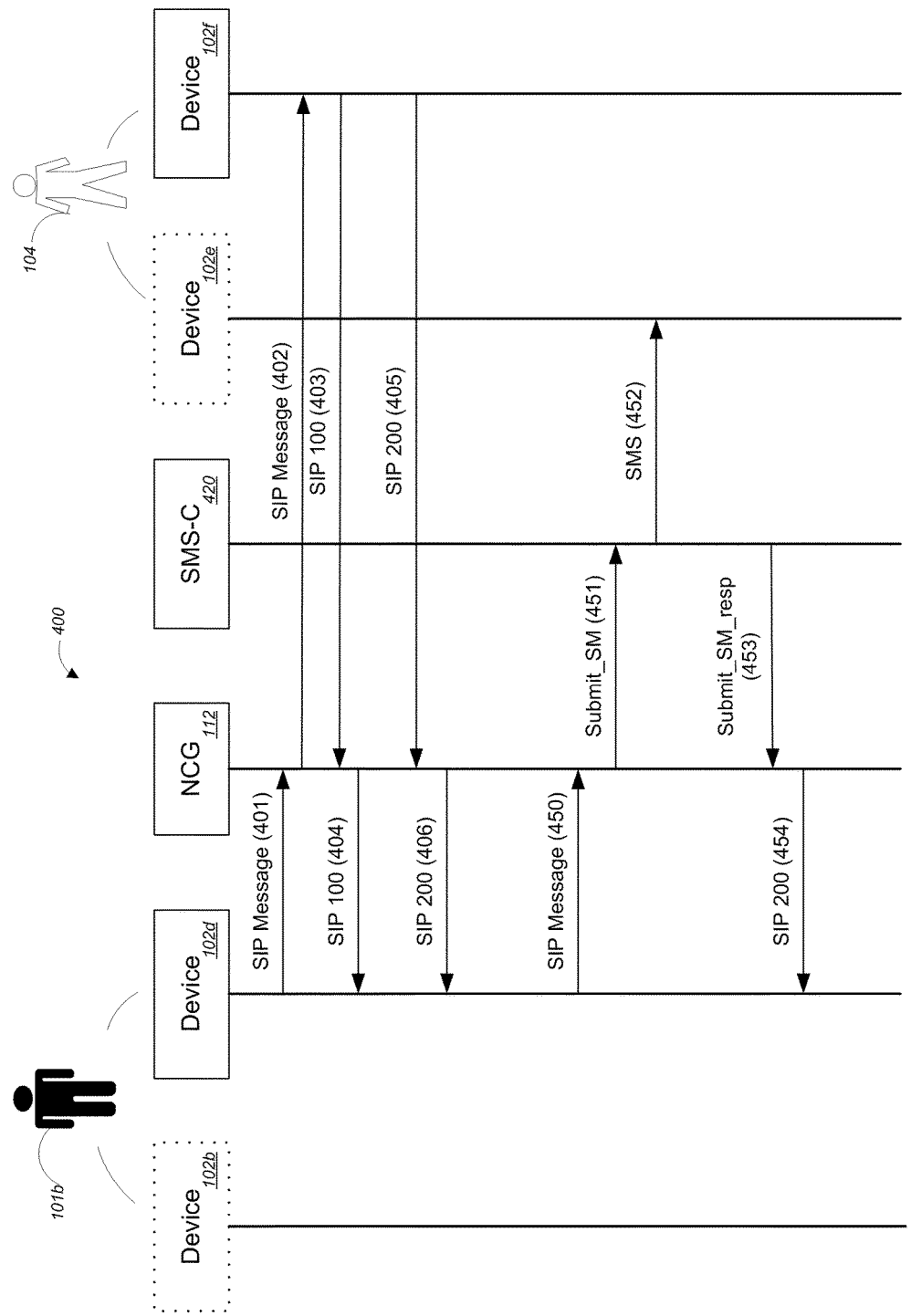
FIGS. 4-5 are timing diagrams of example communications between components of the telecommunication system.

Referring to FIG. 4, a timing diagram 400 illustrates communications among user devices 102, the NCG 112, and an SMS-C 420. The user 101*b* wants to send an instant message (IM) to the user 104. The user 101*b* starts the ABDP device 102*b* (e.g., a softphone application on a laptop or desktop computer, an AMDP device, such as a multi-mode mobile phone) and selects the user 104 from his contact list (e.g., as displayed on a user interface of the softphone application). The user 101*b* selects an option to send an IM to the user 104 composes content to be included in the IM. The ABDP user device 102*b* sends (401) the IM to the NCG 112 as an SIP Message. The NCG 112 receives the SIP message and determines from information stored in the BLR that the user 104 is "available." The NCG 112 uses the presence status saved from the last PUBLISH of the user 104 to direct (402) the SIP message to the ABDP user device 102f associated with the user 104. The device 102f replies (403) "SIP 100" to the NCG 112 indicating that a connection is trying to be established and the NCG proxies (404) the SIP 100 message to the ABDP user device 102b associated with the user 101b. The ABDP user device 102f opens and displays the text message and sends (405) "SIP 200" to the NCG 112, indicating a success. The NCG 112 proxies (406) the SIP 200 message to the ABDP user device 102b associated with the user 101b.

In the example described in the above paragraph, the presence status for the user 104 was "available." However, if the presence status for the user 104 had been "unavailable," a different sequence of events would follow. Referring again to FIG. 4, the user 101b again selects an option to send a message to the user 104 and composes a message on the ABDP user device 102b and sends (450) the message (SIP Message). The NCG 112 receives the message and checks the status for the user 104, who is now "unavailable" or "idle." The NCG 112 sends (451) the message (Submit_SM) to the SMS-C, which then sends (452) the message to the AMDP user device 102e associated with the user 104 and also notifies (453) the NCG 112 (Submit_SM_resp) that the message has been delivered to the AMDP user device 102e. The NCG 112 sends an "SIP 200" message to the ABDP user device 102b, indicating that the message was accepted.

Figure 5:
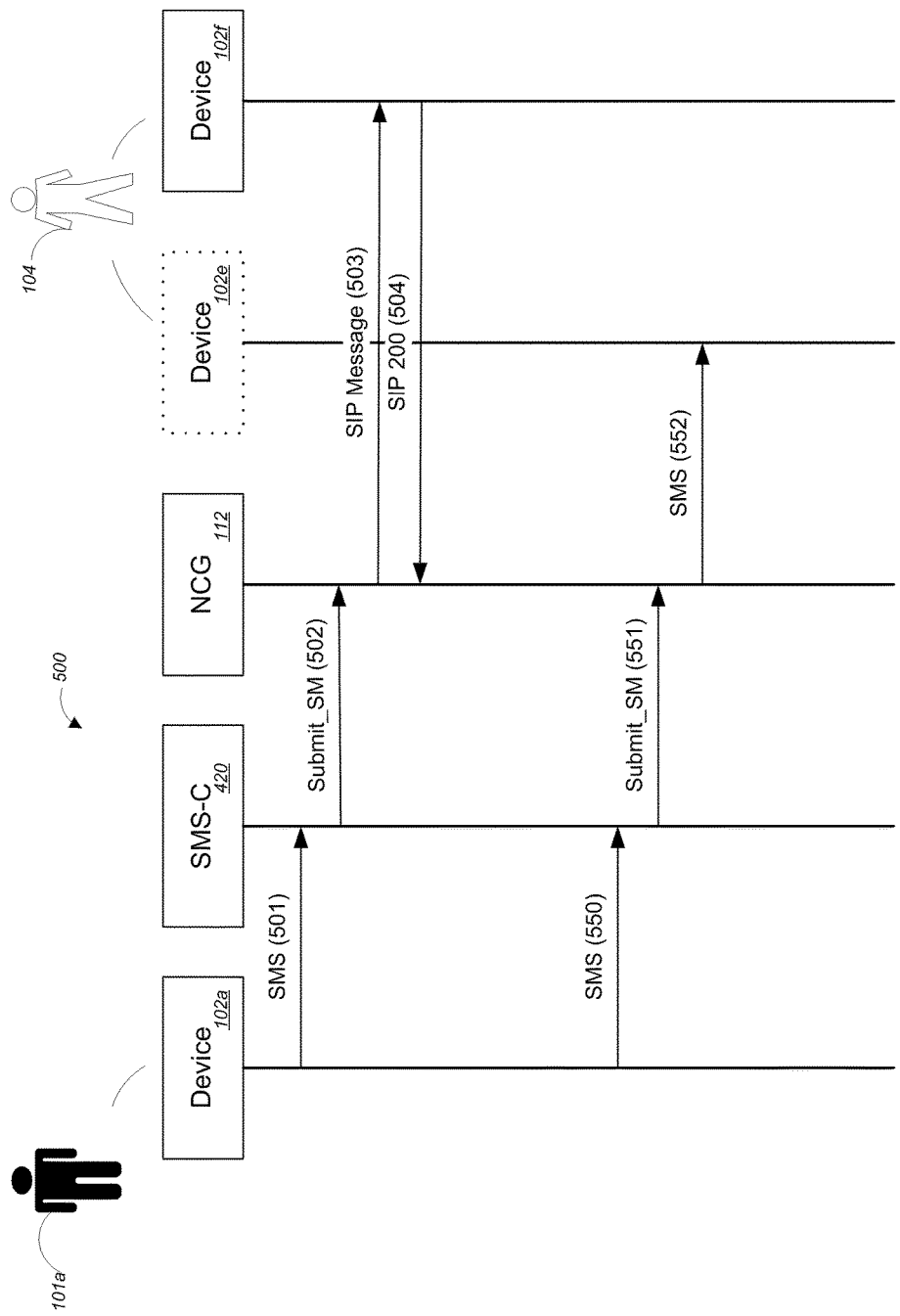

Referring to FIG. 5, a timing diagram 500 illustrates communications among user devices 102, the NCG 112, and the SMS-C 420. The user 101a wants to use the AMDP device 102a (e.g., a mobile phone that is not connected to the NCG 112) to send a message (e.g., a text message, an SMS) to the user 104. The user 101a selects an option to send a message to the user 104 and composes content to be included in the message.

The AMDP user device 102a sends (501) the message to the SMS-C 420, which passes (502) the message to the NCG. The user 104 is associated with two devices, the AMDP user device 102e (e.g., a mobile phone on the mobile domain of the communication system 100) and the ABDP user device 102f (e.g., a laptop computer on the broadband domain of the communication system 100). The NCG 112 determines the user's availability based on information stored in the BLR 116 and forwards the message to one or more user devices based on the determination.

In some examples (depicted as "Example A"), the NCG 112 determines from information stored in the BLR 116 that the user 104 is "available" only on the ABDP user device 102f and sends (503) the message to the ABDP user device 102f using the SIP protocol. The ABDP user device 102f opens and displays the text message and returns (504) a "SIP 200" message to the NCG 112, indicating a success. The NCG 112 stores information representative of this success and directs future messages during the same session only to the ABDP user device 102f. If at any point during the session the user 104 initiates a message using the AMDP user device 102e (i.e., switches from using the ABDP user device 102f), then the NCG 112 will direct all follow-up messages to the AMDP user device 102e.

In some examples (depicted as "Example B"), the NCG 112 determines from information stored in the BLR 116 that the user 104 is "available" only on the AMDP user device 102. In such cases, the NCG 112 sends/returns (505) the message to the SMS-C 420 for onward routing (506) to the AMDP user device 102.

Versions of the system 100 are compatible with cellular telephone approaches that include an EIA/TIA IS-95 digital cellular system, which makes use of code division multiple access (CDMA) technology and the IS-41 standard for mobility management, and a Global System for Mobile Communication (GSM) approach, which makes use the GSM Mobile Application Part (MAP), which provides similar functionality as IS-41. In the cases of CDMA and GSM telephone systems, as described in more detail below, the general approaches used in the system are similar, but are adapted to the particular characteristics and signaling methods for those telephone systems. Communications between components of the system can take place through communications protocols defined in American National Standards Institute section 41 (ANSI-41) and section 721 (Integrated Services User Part) and European Telephone Standards Institute (ETSI) section Global System Mobility (GSM). Alternative versions of the system can also be used with other cellular or non-cellular wireless or wireline telephone approaches (e.g., North America TDMA, PCS, satellite). In at least some embodiments, the equipment that provides an interface between the cellular telephone network and the data network emulates conventional components of the cellular telephone network and/or uses standard signaling approaches used within the cellular telephone network, thereby not necessitating changes or adaptations of the cellular telephone network to provide services over the data network.

Versions of the system 100 are compatible with wireless local area network (WLAN) approaches that use wireless Ethernet (e.g., IEEE 802.11(b)). Wireless Ethernet continues to emerge as a widely deployed wireless networking platform. Many private and publicly accessible WLANs have been deployed, for example, by companies for use by their employees and by commercial and public enterprises (e.g., airports and coffee shops) for their customers and users. Many cellular phone manufacturers have or are planning to install 802.11 wireless antennas and associated electronics in their phones in addition to the antennas and electronics for cellular communication. The user devices 102 can include such telephones, with suitable software and/or hardware configuration for functioning with the system 100. Alternative wireless local network approaches include Bluetooth and approaches that make use of the Industry, Science and Medicine (ISM) band of frequencies or any other suitable band, public or private, or Infrared Data Association (IrDA) specification.

The system can be implemented in software that is executed on a computer system. Different of the phases may be performed on different computers or at different times. The software can be stored on a computer-readable medium, such as a CD, or transmitted over a computer network, such as over a local area network.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method for routing user communication data to a user associated with at least a broadband user device and a mobile user device operable in a communication system including a broadband network and a mobile network, the method comprising:

proxying, at a proxy device on a communication path between the broadband user device and a broadband presence server, a data message sent from the broadband user device to the broadband presence server, including accepting the data message sent to the broadband presence server at the proxy device and passing the accepted data message to the broadband presence server;

extracting, from the data message, information indicative of an availability status of the broadband user device at the proxy device and storing the information indicative of the availability status of the broadband user device in a broadband presence register associated with the proxy device, the broadband presence register including information indicative of an availability status of one or more broadband user devices associated with the broadband network;

storing information indicative of an availability status of the mobile user device in a mobile presence register associated with the proxy device, the mobile presence register including information indicative of an availability status of one or more mobile user devices associated with the mobile network; and routing, at the proxy device, user communication data to at least one of the broadband user device and the mobile user device based at least in part on the information indicative of the availability status of the broadband user device and the information indicative of the availability status of the mobile user device.

2. The method of claim 1, further comprising obtaining information indicative of a geographic location of the first user device, a geographic location of the second user device, or both.

3. The method of claim 1, further comprising generating a set of routing rules and associating the generated set of routing rules with the user, wherein at least some of the routing rules are based on one or more of the following: geographic location of the first user device, geographic location of the second user device, and the availability of the user.

4. The method of claim 3, further comprising storing the generated set of routing rules.

5. The method of claim 3, further comprising generating at least one exception to a routing rule of the set.

6. The method of claim 1 wherein the data message comprises a status indicator.

7. The method of claim 1 wherein the communication system includes a cellular domain and a broadband domain.

8. The method of claim 1, further comprising:
obtaining schedule information associated with the user from a presence-silent application running on the first user device; and
inferring the availability of the user based at least in part on the schedule information.

9. The method of claim 8, further comprising:
identifying a discrepancy between information indicative of a geographic location of the first user device and the schedule information; and
routing the user communication data after resolving the identified discrepancy.

10. The method of claim 1 wherein routing, at the proxy device, user communication data to at least one of the broadband user device and the mobile user device includes
determining, from the information indicative of the availability status of the broadband user device stored in the broadband presence register that the broadband user device is present in the broadband network but is unavailable,
determining, from the information indicative of the availability status of the mobile user device stored in the mobile presence register that the mobile user device is present in the mobile network and is available, and
routing the user communication to the mobile user device based on the determining.

11. The method of claim 10 wherein the information indicative of the availability status of the broadband user device indicates that the broadband user device's availability status is an availability status selected from one of an away status, a busy status, an on the phone status, a not available status, and a do not disturb status, and the information indicative of the availability status of the mobile user device indicates that the mobile user device's availability status is an available status.

12. The method of claim 1 wherein routing, at the proxy device, user communication data to at least one of the broadband user device and the mobile user device includes
determining, from the information indicative of the availability status of the broadband user device stored in the broadband presence register that the broadband user device is present in the broadband network and is available,
determining, from the information indicative of the availability status of the mobile user device stored in the mobile presence register that the mobile user device is present in the mobile network but is unavailable, and
routing the user communication to the broadband user device based on the determining.

13. The method of claim 12 wherein the information indicative of the availability status of the broadband user device indicates that the broadband user device's availability status is an available status and the information indicative of the availability status of the mobile user device indicates that the mobile user device's availability status is an availability status selected from one of an away status, a busy status, an on the phone status, a not available status, and a do not disturb status.

14. The method of claim 1 wherein the broadband presence register and the mobile presence register are implemented in a single data store.

15. Software, embodied on a non-transitory computer-readable medium, including instructions, which when executed on a computer system cause the computer system to implement a method for routing user communication data to a user associated with at least a broadband user device and a mobile user device operable in a communication system including a broadband network and a mobile network, the instructions causing the computer system to:
proxy, at a proxy device on a communication path between the broadband user device and a broadband presence server, a data message sent from the broadband user device to the broadband presence server including accepting the data message sent to the broadband presence server at the proxy device and passing the accepted data message to the broadband presence server;
extract, at the proxy device, from the data message, information indicative of an availability status of the user associated with the broadband user device and storing the information indicative of the availability status of the user associated with the broadband user device in a broadband presence register associated with the proxy device, the broadband presence register including information indicative of an availability status of one or more users associated with one or more broadband user devices associated with the broadband network;
store information indicative of an availability status of the user associated with the mobile user device in a mobile presence register associated with the proxy device, the mobile presence register including information indicative of an availability status of one or more users associated with one or more mobile user devices associated with the mobile network; and
route user communication data to at least one of the broadband user device and the mobile user device associated with the user based at least in part on the information indicative of the availability status of the user associated with the broadband user device and the information indicative of the availability status of the user associated with the mobile user device.

16. A fixed-mobile convergence device for routing user communication data to a user associated with at least a broadband user device and a mobile user device operable in a communication system including a broadband network and a mobile network the device comprising:
a processor;
a storage medium storing software program instructions that are executable by the processor to:
proxy, at a proxy device on a communication path between the broadband user device and a broadband presence server, a data message sent from a broadband user device to the broadband presence server including accepting the data message sent to the broadband presence server at the proxy device and passing the accepted data message to the broadband presence server;
extract, at the proxy device, from the data message, information indicative of an availability status of the broadband user device associated with the data message and storing the information indicative of the availability status of the broadband user device associated with the data message in a broadband presence register associated with the proxy device, the broadband presence register including information of an availability status of one or more broadband user devices associated with the broadband network;
store information indicative of an availability status of the mobile user device in a mobile presence register associated with the proxy device, the mobile presence register including information indicative of an availability status of one or more mobile user devices associated with the mobile network; and
route, at the proxy device, user communication data to at least one of the broadband user device and the mobile user device based at least in part on the information indicative of the availability status of the broadband user device and the information indicative of the availability status of the mobile user device.

\* \* \* \* \*